United States Patent
Dries

(10) Patent No.: US 6,596,242 B1
(45) Date of Patent: Jul. 22, 2003

(54) REACTOR RISER OF A FLUIDIZED-BED CATALYTIC CRACKING PLANT

(75) Inventor: Hubertus W. Albertus Dries, Amsterdam (NL)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 09/435,520

(22) Filed: Nov. 8, 1999

Related U.S. Application Data

(63) Continuation-in-part of application No. 08/903,536, filed on Jul. 30, 1997, now abandoned.

(30) Foreign Application Priority Data

Sep. 30, 1996 (EP) .............................................. 96202726

(51) Int. Cl.$^7$ .............................. B01J 8/08; C10G 11/18
(52) U.S. Cl. ........................ 422/139; 422/145; 422/215; 422/224
(58) Field of Search ................................ 422/139, 146, 422/214–215, 224

(56) References Cited

U.S. PATENT DOCUMENTS

| 855,651 A | * | 6/1907 | Milne | 406/92 |
|---|---|---|---|---|
| 2,763,516 A | * | 9/1956 | Brooke et al. | 406/92 |
| 3,353,925 A | * | 11/1967 | Baumann et al. | 422/214 |
| 3,664,638 A | * | 5/1972 | Grout et al. | 422/257 |
| 4,753,780 A | * | 6/1988 | Bowen | 422/214 |
| 5,851,380 A | * | 12/1998 | Wells | 422/215 |

* cited by examiner

*Primary Examiner*—Hien Tran

(57) ABSTRACT

Apparatus comprising a fluidized-bed catalytic cracking plant riser reactor having an axial passageway extending between said inlet end for receiving hydrocarbonaceous feed and catalyst particles and wherein said outlet end discharges effluent and catalyst particles, which reactor riser is provided with a plurality of contacting devices arranged axially spaced apart in said axial passageway, wherein each said contacting device comprises a mixing element having the shape of a segment of arc, wherein the mixing element of each said contacting device is present in a plane perpendicular to the central longitudinal axis of the passageway and wherein the mixing element of a contacting device is arranged staggered with respect to the mixing element of an adjacent contacting device.

3 Claims, 2 Drawing Sheets

REACTOR RISER OF A FLUIDIZED-BED CATALYTIC CRACKING PLANT

This is a continuation-in-part of application Ser. No. 08/903,536 filed Jul. 30, 1997, now abandoned, the entire disclosure of which is hereby incorporated by reference.

FIELD OF THE INVENTION

The present invention relates to a reactor riser of a fluidized bed catalytic cracking plant. Such a reactor riser has an axial passageway extending between an inlet end for receiving hydrocarbonaceous feed and catalyst particles and an outlet end for discharging effluent and catalyst particles.

BACKGROUND OF THE INVENTION

In addition to the reactor riser, a fluid catalytic cracking plant may include a reactor vessel into which the outlet end of the reactor riser debouches, and a regenerator vessel. During normal operation, regenerated catalyst particles and hydrocarbonaceous feed are supplied to the inlet end of the reactor riser. In the riser the feed is vaporized, and a dispersion of catalyst particles in a gaseous mixture of feed is formed. In the reactor riser catalytic cracking of the feed takes place, and a gaseous mixture of feed and product is obtained. Because the composition of the gaseous mixture of feed and products changes along the riser reactor, this mixture will be referred to as 'effluent'. The dispersion of catalyst particles in the gaseous effluent leaves the reactor riser at a temperature of between 500 and 540° C. or higher. The dispersion is passed into a separator system in the reactor vessel where gaseous effluent is separated from catalyst particles. The gaseous effluent is removed from the upper end of the reactor vessel, and the catalyst particles are discharged to the lower part of the reactor vessel where they are stripped. Stripped catalyst particles are passed to the regenerator vessel where coke deposited on the particles during cracking is burnt-off at a high temperature to obtain combustion products and regenerated catalyst. The combustion products are removed from the upper end of the regenerator vessel and regenerated catalyst is reused. Normally the reactor riser is vertical.

In the reactor riser, the average linear gas velocity is in the range of from 8 to 30 m/s and the average linear velocity of the catalyst particles is up to 25 m/s. The catalyst particles will move substantially con-currently with the gaseous reaction mixture, and it is preferred that there is little slip between gas and particles.

As the cracking reaction takes place on the catalyst particles, good contacting between the gaseous effluent and the catalyst particles is essential for a sufficient degree of conversion and selectivity to the desired products, like for example gasoline.

To improve the contacting between the catalyst particles and the gaseous effluent, it is proposed in U.S. Pat. No. 3,353,925 to provide the reactor riser with a plurality of contacting devices arranged axially spaced apart in the axial passageway of the reactor riser. The known contacting devices comprise an annular mixing element, wherein the central plane of the element is arranged perpendicular to the central longitudinal axis. Consequently at a contacting device, the passage has a diameter that is smaller than the diameter of the axial passageway. When using such a mixing element that does not penetrate too much into the passage, an improved mixing of gas and solids and a decrease in the pressure drop is observed. The decrease in pressure drop results from the fact that the up-flowing gas can carry the solids in a more efficient manner because the gas and solids are better mixed.

It would be desirable to improve the gas-solids mixing even more. This can be achieved by increasing the penetration into the passageway of the mixing device as disclosed in the '925 patent. However, by increasing the penetration depth of the mixing device into the passageway above a certain value, the pressure drop will increase instead of decrease, compared to when no internals are present. This increase in pressure drop will be too high for practical applications, for example erosion of the mixing element will likely occur.

DETAILED DESCRIPTION OF THE INVENTION

Applicant now considers a contacting device which has a relatively large penetration depth, while the pressure drop over the contacting device is maintained at an acceptable level. The pressure drop is even lower when compared to the pressure drop over the contacting devices as described in the earlier referred to '925 patent.

The apparatus according to the present invention comprises a fluidized-bed catalytic cracking plant riser reactor having an axial passageway extending between said inlet end for receiving hydrocarbonaceous feed and catalyst particles and wherein said outlet end discharges effluent and catalyst particles, which reactor riser is provided with a plurality of contacting devices arranged axially spaced apart in said axial passageway, wherein each said contacting device comprises a mixing element having the shape of a segment of arc, wherein the mixing element of each said contacting device is present in a plane perpendicular to the central longitudinal axis of the passageway and wherein the mixing element of a contacting device is arranged staggered with respect to the mixing element of an adjacent contacting device.

An advantage of the present apparatus is that the mixing of solids and gas is enhanced, resulting in higher feed conversions and product selectivity's, while the pressure drop remains low. The non-radial symmetry of the contacting device is the reason for this enhanced mixing, and can be considered as a kind of "static mixer". A further advantage of the mixing element of the present invention is that it can easily be built into the axial passageway of an existing reactor riser.

Because the mixing elements are arranged in a single plane perpendicular to the longitudinal axis of the passageway the relatively slow moving solids along the wall of the passageway are forced into the central region of the passageway. In the central region of the passageway higher gas velocities are present. By forcing the solids into this central region of the passageway a more uniform contacting between gas and solids is achieved. Mixing devices which impart a swirl movement, like elements having a spiral or helical design, and which will not be arranged in a single plane perpendicular to the axis of the passageway, will not achieve the desired effect. This is because, due to the swirl movement and the resulting centrifugal forces, solids will be forced to the wall of the passageway, resulting in a less effective contacting between gas and solids.

Because the mixing elements of the adjacent contacting devices are arranged staggered with respect to each other, all or most of the solids moving along the inner wall will be more effectively mixed with the co-currently moving hydrocarbon gas during its passage in the reactor riser.

BRIEF DESCRIPTION OF THE DRAWINGS

The invention will now be described by way of example in more detail with reference to the accompanying drawings, wherein.

DETAILED DESCRIPTION OF THE DRAWINGS

Figure 1:
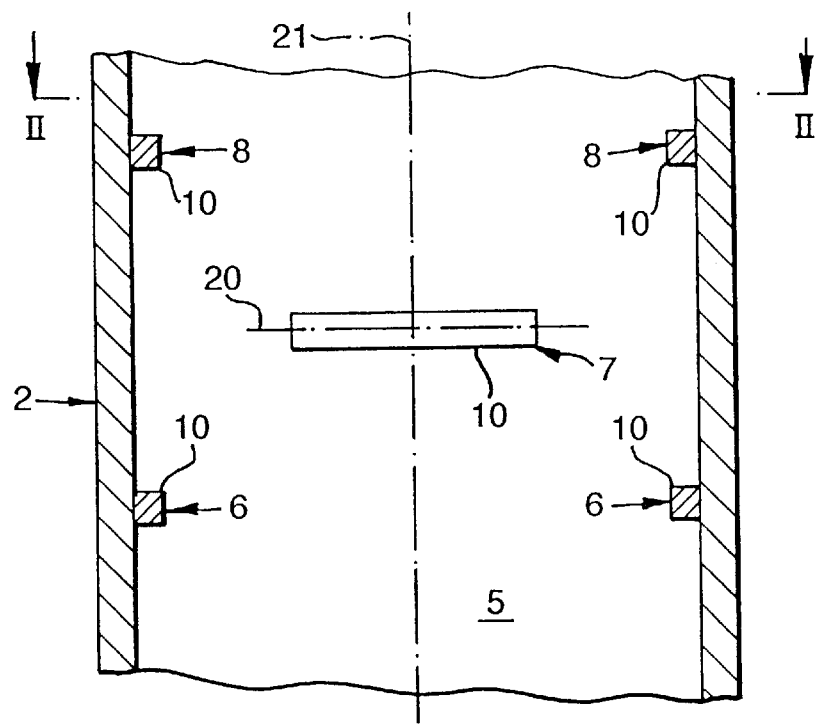
FIG. 1 shows schematically a longitudinal section of part of the reactor riser according to the present invention.
Figure 2:
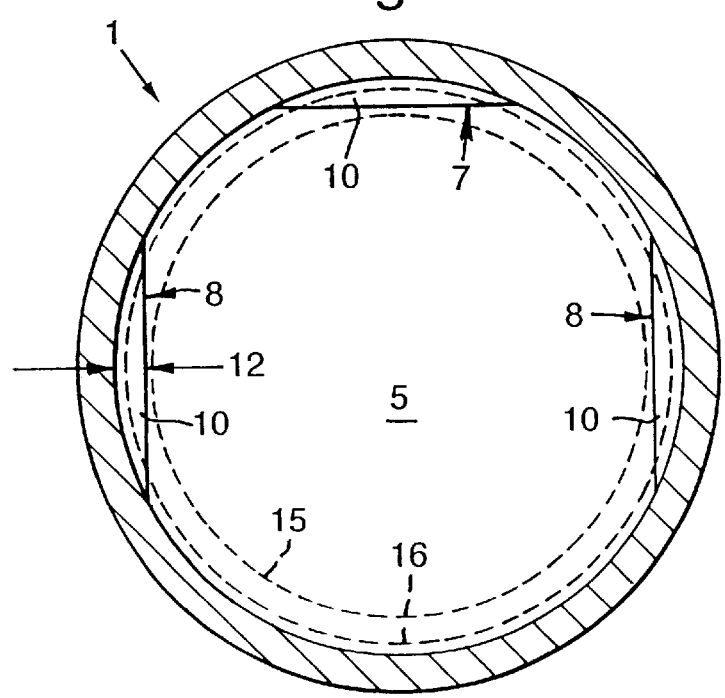
FIG. 2 shows section II—II of FIG. 1.

Reference is now made to FIGS. 1 and 2. The reactor riser is designated with reference numeral 1. For the sake of clarity, any lining on the wall 2 of the reactor riser 1 is not shown. Moreover, because a fluid catalytic cracking plant is well known, the remainder of the plant will not be shown.

The normally vertical reactor riser 1 has an axial passageway 5 extending between an inlet end (not shown) for receiving hydrocarbonaceous feed and catalyst particles and an outlet end (not shown) for discharging effluent and catalyst particles.

The reactor riser 1 is provided with a plurality of contacting devices 6, 7 and 8. The contacting devices 6, 7 and 8 are arranged axially spaced apart in the axial passageway 5. Each contacting device 6, 7 and 8 comprises a mixing element 10 having the shape of a segment of arc and a rectangular cross-section. The penetration depth of the mixing element 10 is the rise 12 of the segment of arc. The mixing element 10 can be connected to the wall of the reactor riser 1 in any known way.

As can be seen, the contacting device 7 has only one mixing element 10, whereas each of the contacting elements 6 and 8 comprises a pair of opposite mixing elements 10. Suitably the number of mixing elements is not more than 4. The axial spacing of the contacting devices is not critical, usually it should be larger than the diameter of the axial passageway 5.

During normal operation a dispersion of catalyst particles in gaseous effluent is passed through the axial passageway 5. The flow of the dispersion is disturbed by the mixing elements 10, and consequently an efficient mixing of catalyst particles and gaseous effluent is obtained.

In FIG. 2 the dashed circle referred to with reference numeral 15 represents the inner periphery of an annular mixing element according to the prior art which has the same penetration depth as the mixing element of the present invention. It will be clear that the area of the passage pertaining to the known contacting device (which corresponds to the area enclosed by the circle 15) is much smaller that the area of the passage pertaining to the contacting device according to the present invention Consequently for the same penetration depth the contacting device according to the present invention will give a much smaller pressure drop than the known contacting device.

The dashed circle referred to with reference numeral 16 represents the inner periphery of another annular mixing element according to the prior art. The diameter of circle 16 is so selected that the area of the passage pertaining to the known contacting device (which corresponds to the area enclosed by the circle 16) is the same as the area of the passage pertaining to the contacting device according to the present invention. It will be clear that the known annular mixing element has a much smaller penetration depth than the mixing element of the present invention.

The mixing element(s) of adjacent contacting devices are arranged staggered with respect to the mixing element(s) of an adjacent contacting device. As shown in the Figures, the mixing elements of adjacent contacting devices are arranged perpendicular to each other. The angle need not be 90°, it can be any acute angle.

The central planes 20 of the mixing elements 10 as shown in the Figures are arranged perpendicular to the central longitudinal axis 21 of the reactor riser 1.

Figure 3:
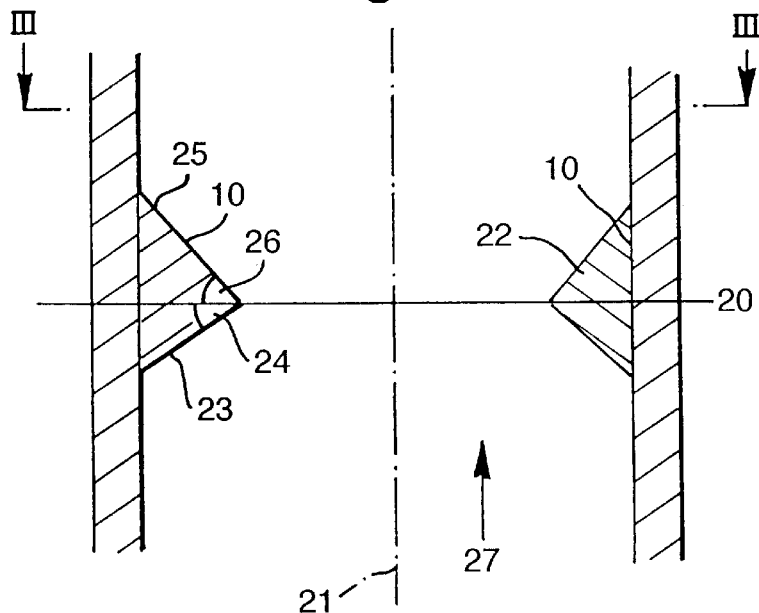
FIG. 3 shows a preferred mixing element.

The mixing elements of the present invention as discussed with reference to FIG. 1 have a rectangular cross-section. In such an embodiment the up-stream surface of the mixing element is arranged parallel with earlier referred to central plane 20 of the mixing element. In a preferred embodiment the up-stream surface is arranged tilted with respect to this central plane 20. The interface of the up-stream surface and the down-stream surface of the mixing element may for example be sharp, rounded or blunt. More preferably the angle between the central plane of the mixing element and the up-stream surface of the mixing element is between 5° and 65° and most preferably below 45°. The down-stream surface is preferably also tilted with respect to this central plane 20. More preferably the angle between the central plane of the mixing element and the down-stream surface of the mixing element is between 5° and 65° and most preferably below 45°. A preferred embodiment of a mixing element is represented in FIG. 3. In FIG. 3 the mixing element 10 has a triangular cross-section 22, wherein the apices of the triangles of each cross-section are located on a straight line. The angle between the central plane 20 of the mixing element 10 and the up-stream surface 23 of the mixing element 10 is Angle 24 in FIG. 3. The angle between the central plane 20 and the down-stream surface 25 of the mixing element 10 is Angle 26. The direction of the gas and solids flow in the passageway is represented by arrow 27. A cross-section III—III would be the same as represented in FIG. 2.

The invention shall be illustrated by the following non-limiting examples.

EXAMPLE 1

Through a vertical tubular pipe, having a diameter of 0.3 m. and with the contacting devices included shown in FIG. 3, a catalyst stream of 1000 kg/min is moved upwards in air at a velocity of 8 m/s. The gas-pressure was measured along the height of the passageway (height above standpipe in FIG. 4), as a method to deduce the actual mixture-density (see diamond-shaped points in FIG. 4). That resulting density was found to be 46 kg/m$^3$.

COMPARATIVE EXPERIMENT A

Figure 4:
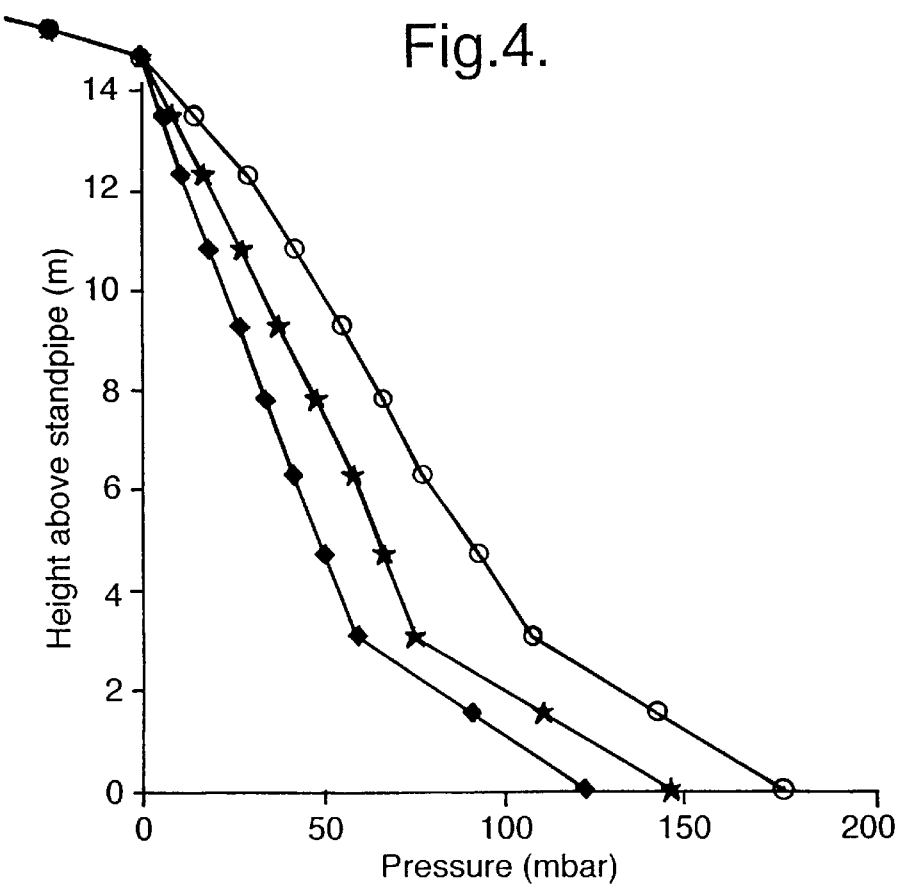
FIG. 4 shows the pressure profile in a riser according to the present invention as measured in the Examples.

Through the same vertical tubular pipe, where the mixing devices had been removed, the mixture-density pressure-drop over the pipe was found to be twice as large, so that the mixture-density was 90 kg/m$^3$ (see FIG. 4, circular-shaped points). This shows that the contents of catalyst is much higher in this case and causes a too intensive contact between the gas and the catalyst that results in an "over"-cracking of the gases towards unfavorable light products and coke.

COMPARATIVE EXPERIMENT B

In the same set-up, the experiment was repeated with the known annular radial-symmetric mixing-devices. The reduction of the cross sectional area due to the mixing device was the same as in Example 1. Now it was found that the mixture density was 70 kg/m3. The star-shaped points in FIG. 4 are of this Experiment.

For the conditions in above Example 1 and the related comparative Experiments it was also investigated how the radial velocity-profile was changed due to the presence of the known and the new internals. It was seen that the well-known phenomenon of catalyst falling down the passageway wall, when there are no internals installed, is absent when the contacting devices were installed. The flatness of the velocity-distribution of the gas-solids mixture was at best when the apparatus according to the invention was used.

With the information collected with the above-described examples, the improvement in yield due to the use of the apparatus according to the invention was calculated making use of a process-hydrodynamic model. The benefits of using the apparatus according to the invention are, at constant coke yield, compared to when no internals are used (as in Experiment A), a 0.9 wt. % improvement in conversion, a 0.05 wt. % yield improvement in hydrocarbons having three and four carbon atoms, a 0.85 wt. % yield improvement in gasoline and a 0.2 wt. % reduction in yield to the less desirable light cycle oil.

What is claimed:

1. Apparatus comprising a fluidized-bed catalytic cracking plant reactor riser having an axial passageway extending between an inlet end for receiving hydrocarbonaceous feed and catalyst particles and an outlet end for discharging effluent and catalyst particles, which reactor riser is provided with a plurality of contacting devices arranged axially spaced apart in said axial passageway, wherein each said contacting device comprises a mixing element having the shape of a segment of arc, wherein said mixing element is present in a plane perpendicular to a central longitudinal axis of said axial passageway and wherein said mixing element of a first selected contacting device is arranged staggered with respect to said mixing element of a selected adjacent contacting device in said axial passageway wherein said mixing elements of said contacting devices have a triangular cross-section; and wherein the angle between the up-stream surface of said mixing elements and the central plane of said mixing elements, which central plane is arranged perpendicular to said longitudinal axis of said passageway, is between 5° and 65°.

2. Apparatus according to claim 1, wherein at least one of said contacting device: comprises a pair of mixing elements which are diametrically opposed across said axial passageway.

3. Apparatus according to claim 1, wherein the angle between the up-stream surface of said mixing elements and the central plane of said mixing elements, which central plane is arranged perpendicular to said longitudinal axis of said passageway, is between 5° and 45°.

* * * * *